UNITED STATES PATENT OFFICE.

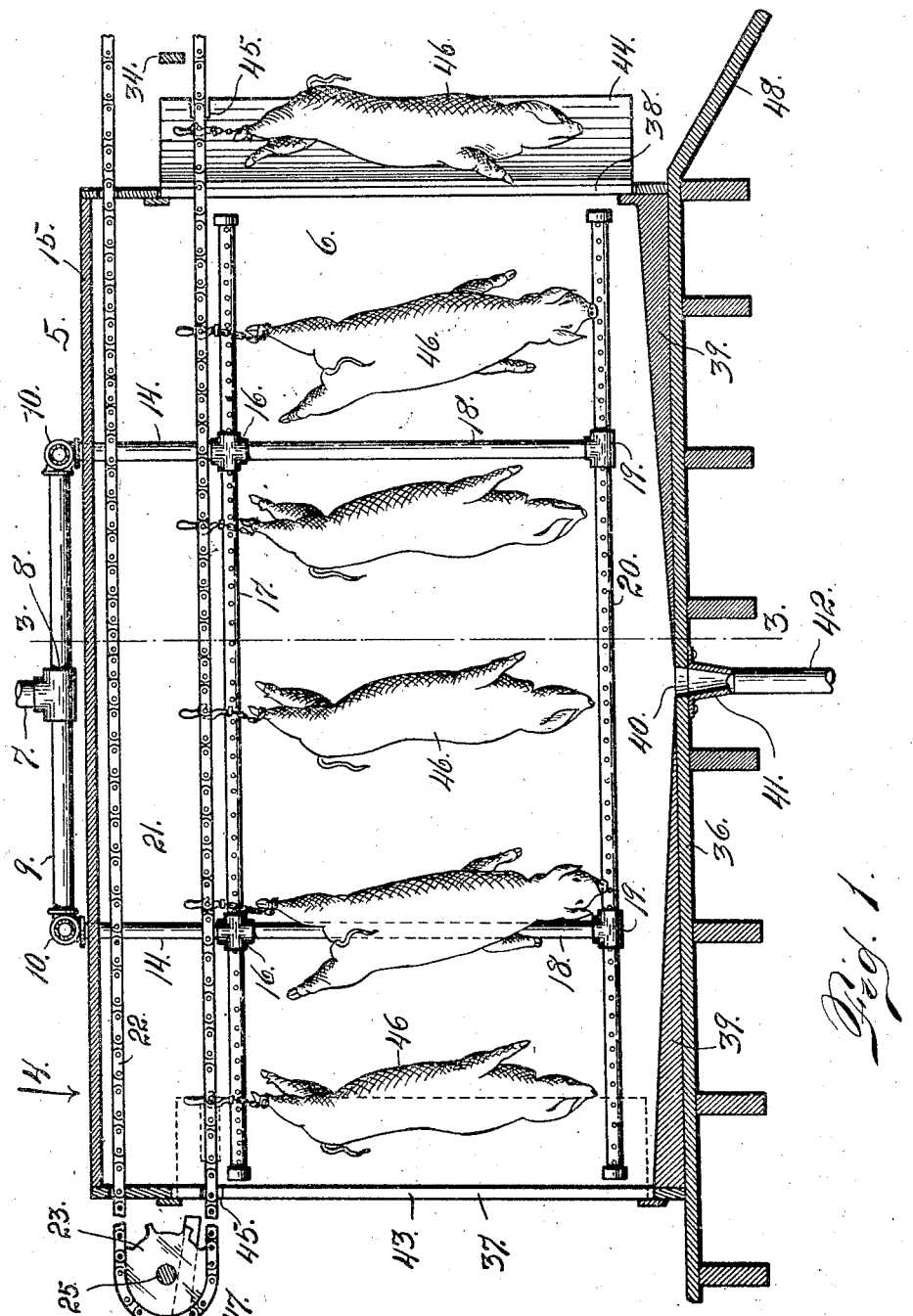

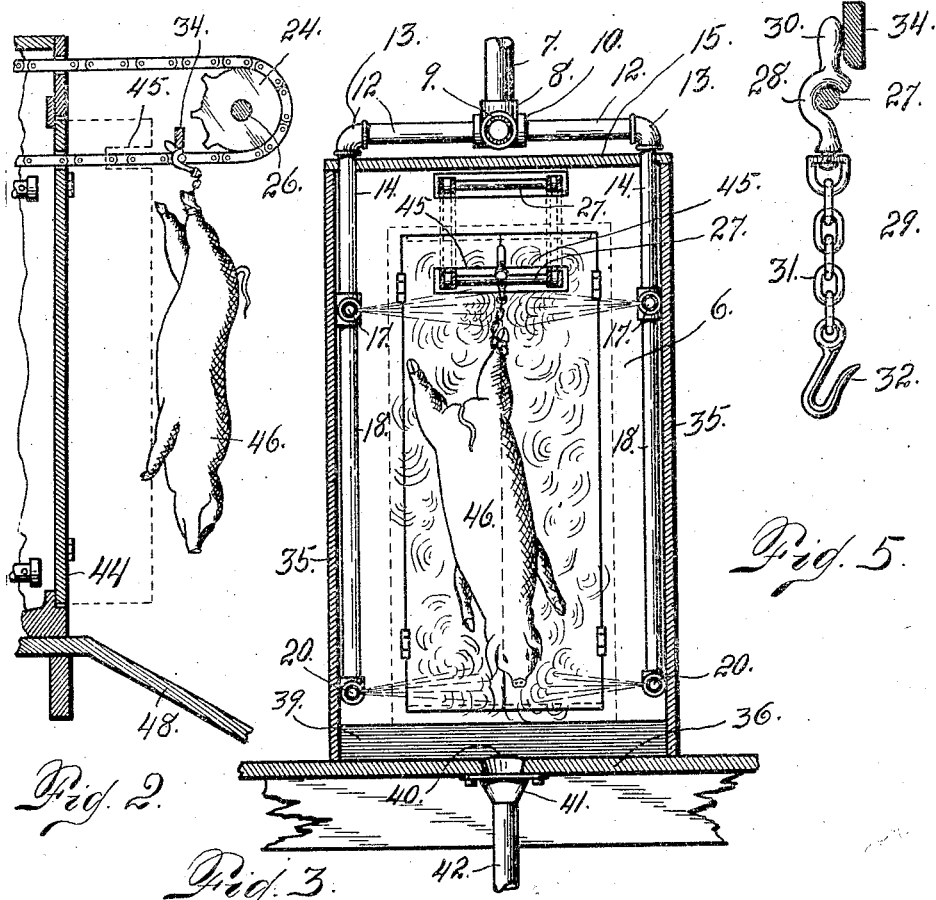

GEORGE C. MORRISON, OF DENVER, COLORADO.

HOG-DRESSING MACHINE.

1,146,589.  Specification of Letters Patent.  Patented July 13, 1915.

Application filed September 9, 1914.  Serial No. 860,841.

*To all whom it may concern:*

Be it known that I, GEORGE C. MORRISON, a citizen of the United States, residing at the city and county of Denver and State of Colorado have invented certain new and useful improvements in Hog-Dressing Machines; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in hog dressing apparatus.

The feature to which this invention relates more particularly is a single step in the hog dressing operation, namely, the loosening of the bristles by subjecting the carcass to the action of steam or vapor, either in its dry state or in its partially condensed form, the carcasses being arranged to travel through the chamber in such a separated condition that the steam, vapor or other fluid may circulate entirely around each individual carcass. Furthermore, by virtue of this arrangement, an important sanitary feature is accomplished since the carcasses are sufficiently separated to prevent any carcass from touching another carcass during this operation. By virtue of this arrangement, it is impossible for a diseased carcass to contaminate or injure a healthy carcass, even though both are traveling through the hair-loosening chamber at the same time, and are arranged upon the carrier adjacent, but not in contact with each other. This is a very important feature since it sometimes happens that diseased carcasses find their way into the hog dressing plant, having escaped the detection of the inspectors. In case this should happen, my improved construction obviates the possibility of diseased carcasses injuring the other carcasses with which it may be associated or handled.

The mechanical features of my improved construction consist of an approximately tight chamber through which the hogs are passed, being carried therethrough through the agency of an endless traveling conveyer with which the carcasses are connected as they move downwardly from the killing room, preparatory to loosening the bristles. Each carcass as it is brought into the room where the hair-loosening chamber is located, is suspended from a sort of track by means of a shackle connected with one of the hind legs of the carcass. The person in charge of the apparatus connects a suitable shackle with the other leg and then connects the shackle with a rung of the conveyer. Approximately at the same time that this occurs, the shackle which engages the track from which the carcasses travel from the killing room, becomes disengaged from the said track, and the conveyer carries the carcasses into the steam chamber through a pair of doors which swing open in response to the pressure of the carcass, allowing the latter to enter said chamber, after which the doors automatically return to the closed position, thus maintaining the chamber practically air tight at the inlet extremity. The doors of the inlet extremity will open inwardly, while the doors of the opposite or exit extremity open outwardly as the carcasses press against them, successively in response to the travel of the conveyer therethrough. The conveyer is preferably composed of two endless chains which are substantially separated by rungs which are located at proper intervals, these intervals being determined with reference to the necessary spacing of the carcasses during their travel through the steam chamber. After each carcass has passed beyond the doors of the exit extremity of the chamber, the stationary trip engages the shackle from above and disconnects the latter from the rung of the conveyer, allowing the carcass to fall downwardly upon an inclined platform, whence it passes automatically to the next compartment or locality where the loosened bristles are to be removed.

The steam chamber is equipped with a suitable pipe system which is perforated to allow the steam, vapor or partially condensed steam to enter. It is preferred to deliver this steam or vapor to the upper and lower portions of the chamber, that is to say, both above and below the carcasses since better results appear to be obtained in this manner than where the jets of steam or vapor are caused to strike the carcass directly.

Having briefly outlined my improved construction, I will proceed to describe the same in detail, reference being made to the accompanying drawing in which is illustrated an embodiment thereof.

In this drawing, Figure 1 is a vertical longitudinal section taken through the steam chamber constituting the chief element of my improvement. Fig. 2 is a fragmentary view illustrating a portion of the right-hand extremity of Fig. 1, the latter having been broken away for lack of room on the sheet. Fig. 3 is a cross section taken through the steam chamber on the line 3—3, Fig. 1. Fig. 4 is a top plan view of the left-hand extremity of the structure or a view looking in the direction of arrow 4, Fig. 1. Fig. 5 is an elevation in detail of one of the carcass-holding shackles.

The same reference characters indicate the same parts in all the views.

Let the numeral 5 designate a casing which, as illustrated in the drawing, is rectangular in shape in top, side, plan and end views. In other words, this casing incloses a chamber 6, which is supplied with steam or vapor through a pipe system of any suitable construction or arrangement. As illustrated in the drawing, the steam or vapor supply is obtained from a conduit 7, which it may be assumed is connected with any suitable source of supply (not shown). This conduit is connected by the usual T 8 with a horizontally disposed pipe 9, whose opposite extremities are connected by means of T's 10 with transversely arranged pipe members 12. The opposite extremities of these members 12 are connected by means of elbows 13 with vertically disposed pipe members 14 which pass through the top 15 of the tank and project downwardly through the upper portion thereof, where they communicate by means of suitable connections 16, with upper horizontally disposed perforated pipes 17 which are arranged on opposite sides of the upper portions of the chamber, in a plane slightly above the carcasses whose hair is to be loosened through the instrumentality of my improvement. The pipe members 14 also communicate with other vertically disposed pipe sections 18 which extend downwardly to points near the bottom of the chamber where they communicate by means of T connections 19, with horizontally disposed perforated pipes 20, which extend longitudinally of the chamber and on opposite sides of the path through which the carcasses travel. In the upper portion of this chamber above the perforated pipes 17, is located a traveling conveyer 21, composed of two endless chain members 22, whose upper portions are located within the chamber and whose extremities engage sprocket wheels 23 and 24 located beyond the chamber far enough so that the carcasses may be attached before they enter the chamber and detached after they leave the chamber. The sprocket wheels are mounted upon shafts 25 and 26 with either or both of which power may be connected for actuating the conveyer. The two endless chains are spaced by rungs 27 which are located at suitable intervals and with which the hooks 28 of shackles 29 are connected. Each of these shackles has an upwardly projecting lug or extension 30, while a short chain 31 is connected with its lower extremity and is of sufficient length to wrap around the one leg of the carcass. The chain element of this shackle terminates in a hook 32 which may be connected into a link of the shackle after the chain has been suitably passed around a leg of the carcass. The hook portion 28 of the shackle has a side opening 33, whereby its upper bearing upon the rung of the shackle is relatively short, thus requiring but little rearward movement on the part of the lug or extension 30 in order to disconnect the shackle from the rung and allow the carcass to drop. This is automatically accomplished by arranging a stationary bar constituting a stop 34 in the path of the lugs or extensions 30 of the shackles, after the carcasses pass beyond the exit doors of the steam chamber.

As illustrated in the drawing, the steam chamber is formed in addition to the top wall 15 by opposite side wall 35, a bottom 36 and front and rear end walls 37 and 38. The bottom of the chamber is provided with wedge-shaped members 39 which are thickest at their extremities adjacent the opposite ends of the chamber and gradually diminish in thickness as they extend inwardly to the center of the chamber in which is formed an outlet opening 40, which communicates with the depending nozzle 41 with which is connected a drain pipe 42. By virtue of this arrangement the condensation of the chamber is carried away to the sewer or other desired locality. The front end wall 37 of the chamber is provided with an opening which is normally closed by inwardly swinging doors 43 which open inwardly as heretofore explained, in response to the inward pressure of the carcasses as they move with the conveyer thereagainst. As soon as any carcass leaves the doors, the latter swing to the closed position automatically by virtue of the spring hinges or in response to any other suitable arrangement. The exit extremity of the chamber is provided with similar doors 44 which swing outwardly in response to the outward pressure of the moving carcasses as they pass out of the chamber. These doors also close automatically by virtue of their being hung upon spring hinges or any suitable spring arrangement or construction may be employed to accomplish this purpose.

As the conveyer 21 extends entirely through the chamber and to a short distance at the opposite ends thereof, and as the lower rung of the conveyer must be in line with the upper portion of the openings which are normally closed by the doors, both pairs of doors must be provided with slots 45 of sufficient width to accommodate the conveyer. These openings need not be any larger than necessary in order to allow the conveyer to pass without interference.

From the foregoing description, the use and operation of my improved construction will be readily understood. It may be assumed that the carcasses which I will designate by the numeral 46, move downwardly into the room where the steam chamber is located, on a track 47 of any suitable construction, and which is arranged to terminate just forward of the front end of the chamber. As the carcasses move downwradly or into the inclosure where the steam chamber is located upon this track, they are suspended from the track from one leg, by the employment of suitable shackles not shown. As the carcasses approach the forward end of the steam chamber upon this track and before they reach the inwardly opening doors, the person in charge of this work connects a shackle of the construction shown in Fig. 5 with the free hind leg of each carcass, by wrapping the chain 31 around this leg and connecting the hook 32 with one of the links and connecting the hook portion 28 of the shackle with one of the rungs 27 of the conveyer. As soon as this is accomplished, the shackle which was connected with the other leg of the carcass and which was riding upon the track 47, automatically disengages itself from the track as the latter terminates just in front of the upper portion of the steam chamber. The carcass is then carried through the instrumentality of the conveyer, against the inwardly opening front doors of the chamber, and passes thereinto and therethrough. As soon as one carcass enters the chamber, another one is connected in front of the chamber with another rung of the conveyer in the same manner, and in this way the operation of passing carcasses through the steam chamber may be continuous and uninterrupted as long as may be required, or until the supply in the killing room is exhausted. This chamber may be of any suitable length that may be required in order to properly loosen the bristles of the carcasses as they are passing through the chamber, through the instrumentality of the steam, hot vapor or other fluid which it may be desired to apply. As each carcass passes out of the chamber at its rear end and the outwardly opening doors swing inwardly, the upper extension 30 of the shackle engages the stop 34, which acts to move the hook extremity of the shackle far enough rearwardly to disconnect it from the rung of the conveyer, allowing the carcass to drop upon a downwardly inclined platform 48 through whose agency it passes to the desired room or locality where the dressing of the carcass is to be continued.

Having thus described my invention, what I claim is,—

1. In combination, a steam chamber having swinging doors at its opposite ends, means extending through the upper portion of the chamber and projecting therefrom at both ends for carrying carcasses through the chamber, and means for introducing steam or vapor into the lower portion of said chamber at points in close proximity to the entire path of travel of the lower extremities of the said carcasses.

2. In combination, a steam chamber, means extending through the upper portion of said chamber for carrying carcasses therethrough, and means located in the lower part of the chamber for introducing steam or vapor therein, said means extending approximately the entire length of the said chamber and lying in close proximity to the path of travel of the lower extremities of the carcasses.

3. In combination, a steam chamber, means extending through the upper portion of said chamber for carrying carcasses therethrough, a pipe located in the lower part of the chamber and extending longitudinally thereof, said pipe being connected with a suitable steam source, provided with perforations throughout its length and lying in proximity to the path of travel of the lower extremities of the carcasses.

4. In combination, a steam chamber, means extending through the upper portion of said chamber for carrying carcasses therethrough, pipes located in the lower portion of said chamber and extending approximately the entire length thereof, said pipes being provided with means at points throughout their length for introducing steam or vapor into the path of travel of the lower extremities of said carcasses.

In testimony whereof I affix my signature in presence of two witnesses.

GEORGE C. MORRISON.

Witnesses:
 MAZE KIRBY,
 A. EBERT O'BRIEN.